United States Patent
Lundell

[11] Patent Number: 5,919,578
[45] Date of Patent: Jul. 6, 1999

[54] FRICTION WELDED PRODUCT AND METHOD FOR MANUFACTURING THEREOF

[75] Inventor: Lars-Gunnar Lundell, Sandviken, Sweden

[73] Assignee: Sandvik AB, Sandviken, Sweden

[21] Appl. No.: 08/787,220

[22] Filed: Jan. 22, 1997

[30] Foreign Application Priority Data

Jan. 22, 1996 [SE] Sweden ................................. 9600217

[51] Int. Cl.$^6$ .............................. B32B 15/18; B32B 1/08; B32K 20/12
[52] U.S. Cl. ..................... 428/638; 428/683; 228/114.5
[58] Field of Search .................................. 428/638, 683; 228/114.5; 175/435

[56] References Cited

U.S. PATENT DOCUMENTS

| | | | |
|---|---|---|---|
| 3,134,169 | 5/1964 | Hollander et al. | 228/114.5 |
| 4,181,845 | 1/1980 | Bolton | 219/8.5 |
| 4,461,513 | 7/1984 | Berchem | 299/88 |
| 4,488,608 | 12/1984 | Berchem | 175/374 |
| 4,582,242 | 4/1986 | Spindler | 228/113 |
| 4,597,456 | 7/1986 | Ecer | 175/371 |
| 4,747,604 | 5/1988 | Nakamura | 277/83 |
| 4,805,705 | 2/1989 | Liljebrand | 173/80 |
| 5,088,638 | 2/1992 | Karaev et al. | 228/112 |

*Primary Examiner*—John J. Zimmerman
*Attorney, Agent, or Firm*—Burns, Doane, Swecker & Mathis, L.L.P.

[57] ABSTRACT

A friction welded product for rock drilling and method for manufacturing thereof, the product including a first component (25) and a second component (22) of parent material joined by a friction weld (27). The components have a central inner passage (26) and both components are made from a steel having a chemical composition such that the hardness in the most tempered part of the heat affected zone close to the weld is at least the same as that of the core hardness of the rod. Further, the product exhibits normal hardness when cooled to room temperature subsequent to the friction welding thereby having a minimum core hardness at the heat affected zone above 390 HV1.

17 Claims, 4 Drawing Sheets

FRICTION WELDED PRODUCT AND METHOD FOR MANUFACTURING THEREOF

FIELD OF THE INVENTION

The present invention relates to a friction welded product for rock drilling and a method for manufacturing such product by friction welding.

BACKGROUND OF THE INVENTION

Conventional rods for rock drilling either have a thread machined directly in the rod or a thread machined in a rod end forged to a diameter larger than the rod diameter. Instead of forging up the dimension of rods it is possible to friction weld end pieces or guiding pieces with diameters larger than the rod diameter. Conventional rock drilling rods are most often manufactured from holed rods and adapters from solid rods. For threaded rods at least one thread is often machined in a bumped up (forged) end with a diameter larger than the rod diameter while shank adapters often are machined from rounds.

Instead of forging up the dimension or using extensive machining it has been more and more common to friction weld together pieces with large differences in diameter. However, drill equipment manufactured from conventional drill steel in this manner include weak, i.e., "soft", heat affected zones (Z) on both sides of the weld interface, as shown in FIGS. 1A and 1B. These soft zones (Z) have lower hardness than the unaffected portions of the rod and are thus the weakest parts of the rod. To increase the strength of the soft zones to approach that of the unaffected portions of the rod, it is therefore necessary to alternately carburize, normalize or harden this type of rod after friction welding, as shown in FIGS. 2A and 2B.

Another way is to compensate for the weaker strength in the soft zones by bumping up the rod end before friction welding, as shown in FIG. 3.

SUMMARY OF THE INVENTION

One object of the present invention is to overcome drawbacks of the prior art by providing a friction welded rock drilling product wherein the heat affected zone is as strong as the product itself.

Another object of the present invention is to provide a friction welded rock drilling product having a high strength weld.

Still another object of the present invention is to provide an effective method for manufacturing rock drilling products by friction welding without softening the product.

Still another object of the present invention is to provide an effective method for manufacturing rock drilling products such as rock drill rods and shank adapters combined from two or more pieces which are friction welded together without subsequent carburization or other heat treating process.

DETAILED DESCRIPTION OF THE INVENTION

Figure 4A:
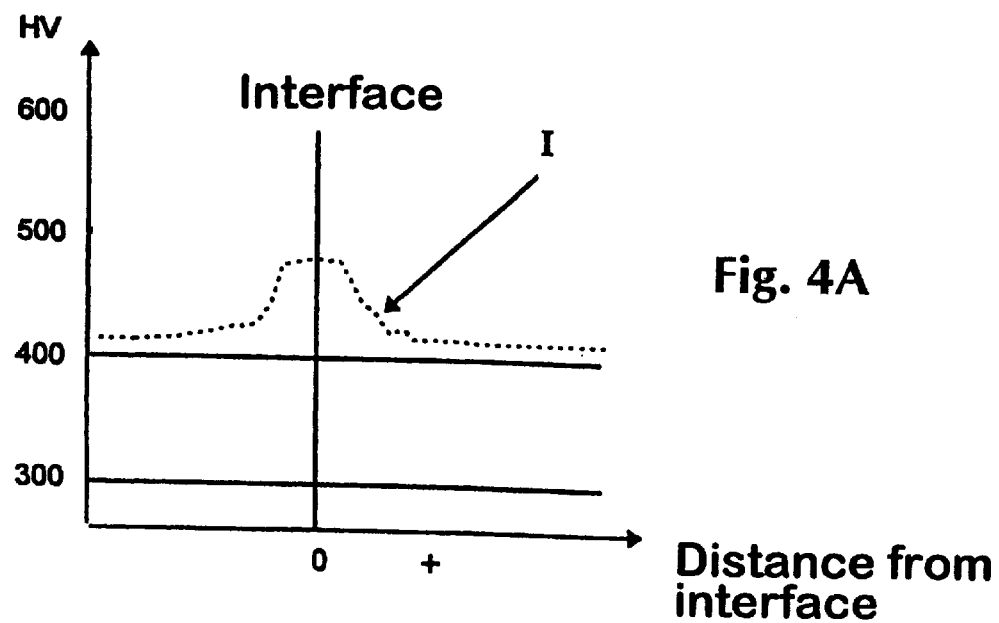
FIG. 4A shows a core hardness distribution graph in the longitudinal direction of a friction weld of two drill steel ends according to the present invention shown in FIG. 4B without heat treatment.
Figure 4B:
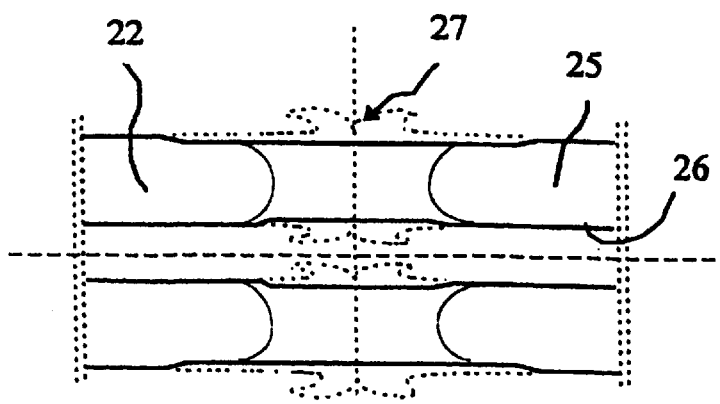

Drill tools, such as a drill or a rod for percussive drilling to be manufactured, usually include a stationary or non-rotatable component 25 and a rotatable component 22 (see FIG. 4B). The components 22,25 are made of steel and before friction welding starts, the core material of each component is uniform and is as such called parent material.

The function of the friction welding device, not shown, is described hereinafter. A chuck means is opened and the shank 22 of the drill bit is inserted therein. The chuck means is closed to grip the shank in an aligned position. Then a clamp means is opened and the end of the drill rod 25 is inserted therein. The clamp means is closed to grip the rod in an aligned position. Then, the drill bit starts to rotate and the clamp means feeds the free end of the rod towards and into contact with the free end of the bit. The heat produced during friction welding makes it possible to forge the abutting ends. The relative rotation of the components is stopped and the components are pushed further together and cooled, as shown in FIG. 4B. The method of friction welding is more specifically described in SE-A-9502153-1, the disclosure of which is hereby incorporated by reference.

Figure 1A:
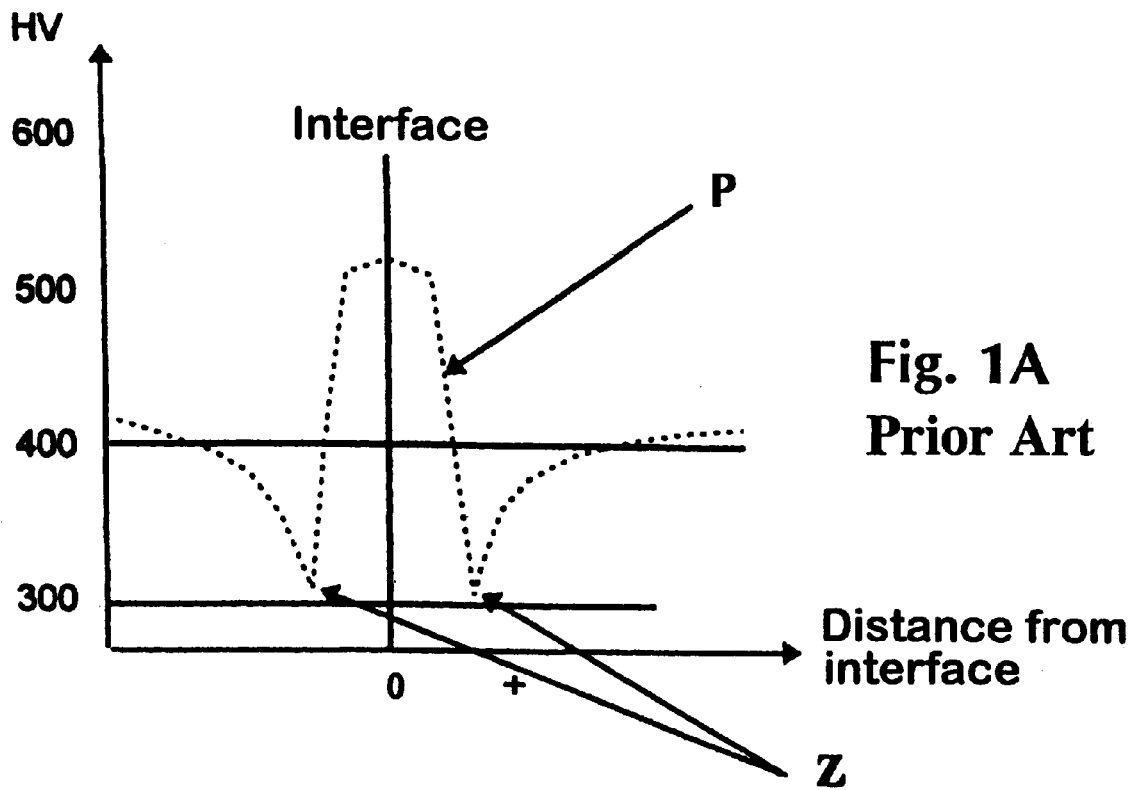
FIG. 1A shows a core hardness distribution graph in the longitudinal direction of a prior art friction weld of two drill steel ends shown in FIG. 1B before heat treatment.
Figure 1B:
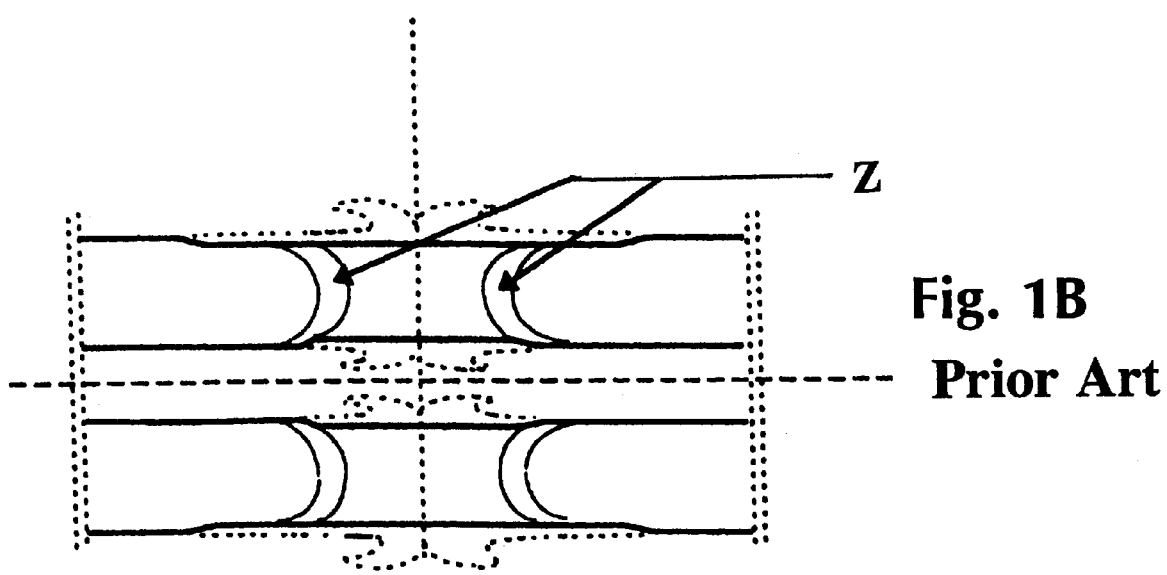
Figure 2A:
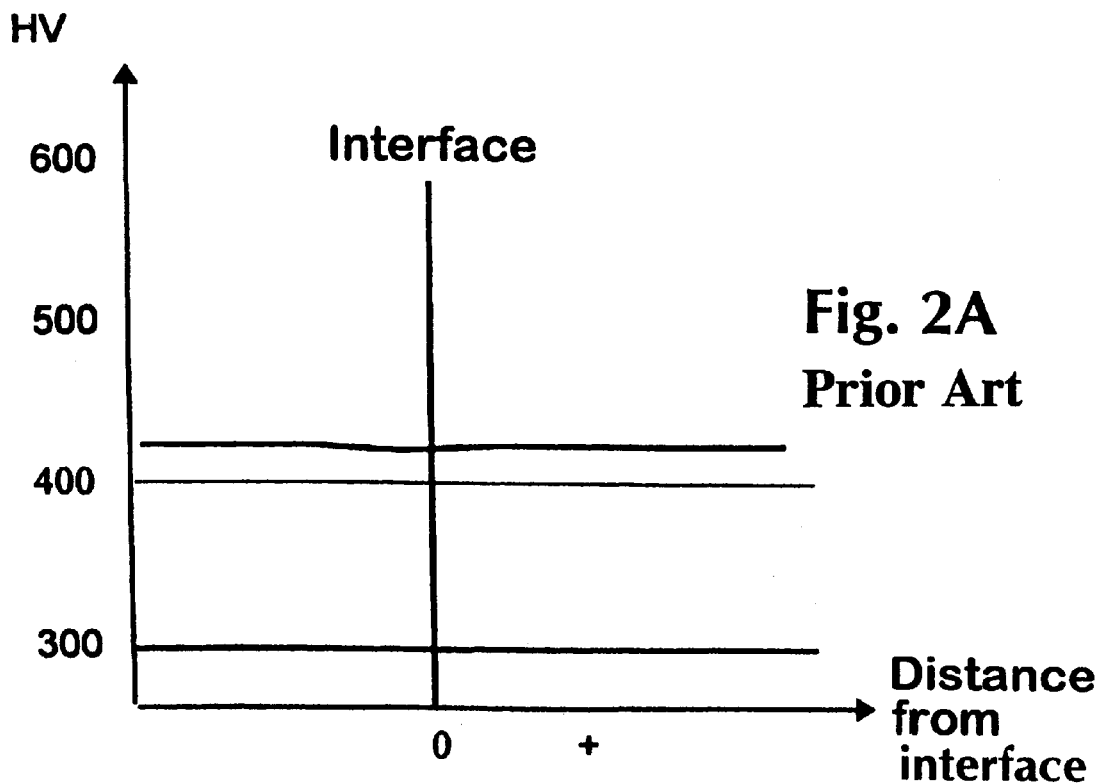
FIG. 2A shows a core hardness distribution graph of the prior art friction weld of two drill steel ends shown in FIG. 2B after heat treatment.
Figure 2B:
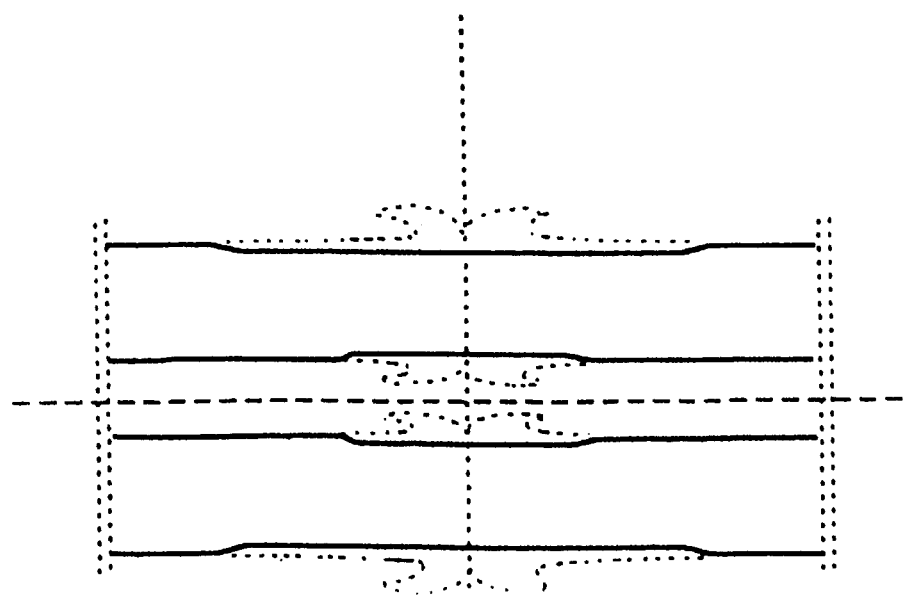
Figure 3:
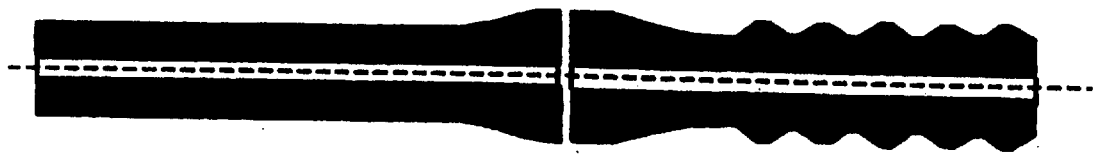
FIG. 3 shows a prior art bumped up rod before friction welding in a longitudinal cross-section.

Conventionally, the friction weld will comprise soft zones (Z) on either side of the interface, as shown in FIGS. 1A and 1B. The interface can be defined as the bonding zone between the two components. To make the heat affected zone (HAZ) as strong as the rod itself, it is possible to use a steel that has a chemical composition such that the hardness in the most tempered part of the HAZ close to the weld is so high that after a short period of heating and pressure during friction welding, the hardness will not decrease below the core hardness of the rod with normal hardness, for instance 400 HV1 (HV1 is Vickers hardness with a load of 1 kp) when cooled to room temperature. As shown in FIG. 4A, the core hardness profile shown with a dotted line (I) substantially increases from the parent material towards the interface.

Compared to conventional drill steel, a suitable steel according to the invention has higher hot hardness and/or a secondary hardening between 550–610° C. With "higher hot hardness" is here meant that the steel used in connection with the present invention has a hot hardness about 200 HV0.5 (HV0.5 is Vickers hardness with a load of 0.5 kp) at 600° C. compared to a conventional steel wherein the hot hardness is about 100 HV0.5 at 600° C.

The core hardness of the softest part of the HAZ in the drill rod according to the present invention is higher or about equal to the hardness of the parent material but not less than 3% lower than the hardness of the parent material. Preferably, at a core hardness of 400 HV1 in the parent material of a steel rod according to the present invention, the minimum hardness in the "soft zone" after friction welding shall be higher than or about 400 HV1 and not less than 390

HV1. For a conventional steel rod with a core hardness of 400 HV1, the minimum hardness in the soft zone (Z) after friction welding is much lower than 400 HV1 and normally about 325 HV1.

Figure 5:
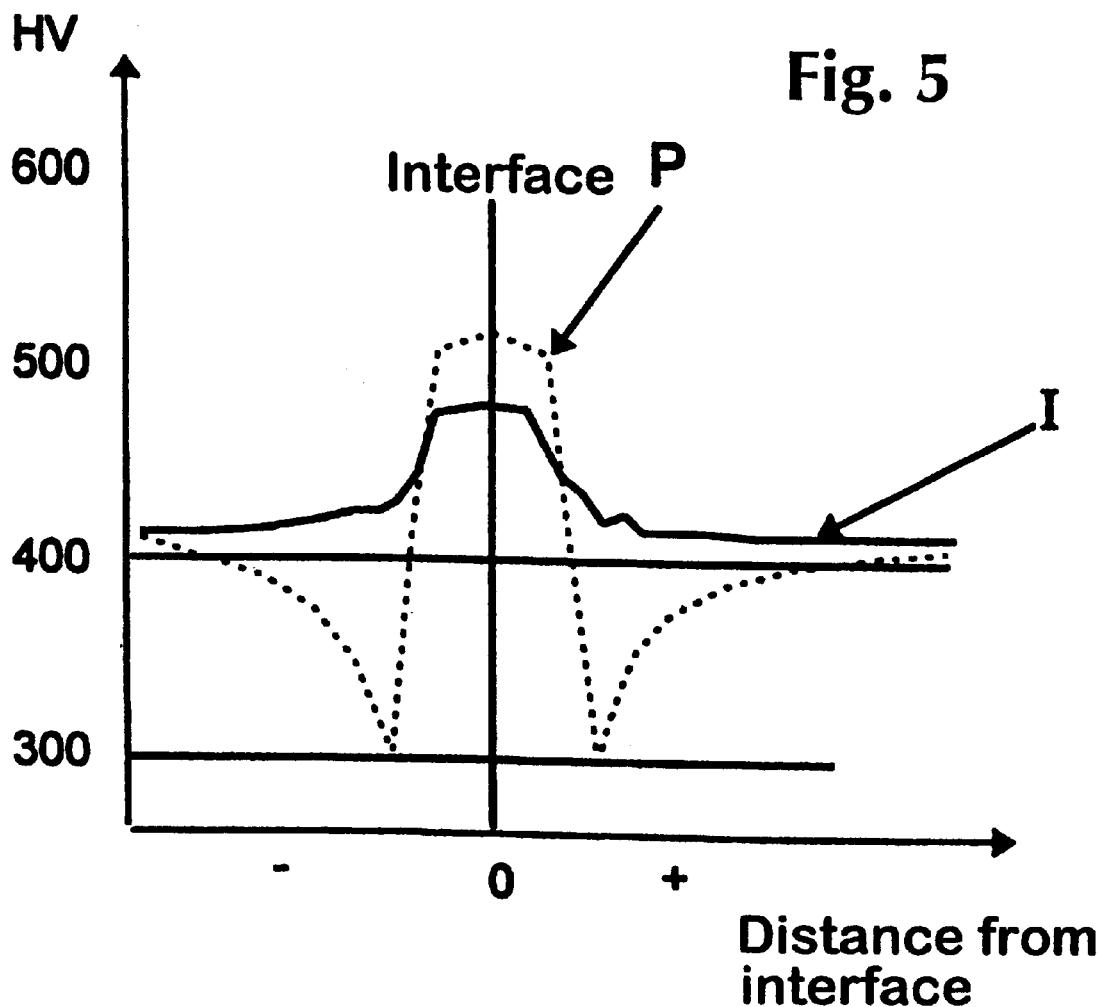
FIG. 5 shows a core hardness distribution graph of a friction weld of two drill steel ends according to the present invention in comparison with the conventional friction weld.
Figure 6:
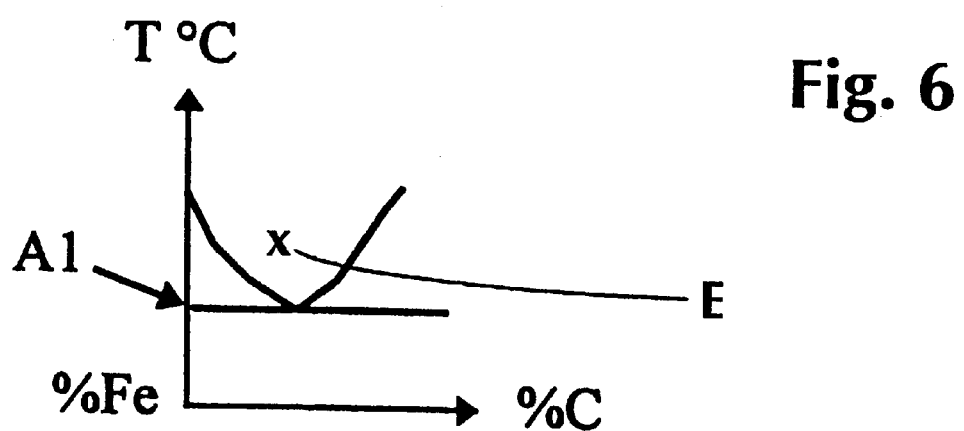
FIG. 6 shows a schematic Fe—C phase diagram of a material used in the element according to the present invention.

The component and the rod shall have a hardness in the HAZ that is higher than or about 400 HV1 and not less than 390 HV1. The strength in the HAZ is comparable with that of the parent, i.e., the non-heat affected steel, material. The hardness, shown by line (I) in FIG. 5, in the normally soft zone is at least at the same level as the normal core hardness, shown with a dotted line (P) in FIG. 5. In a conventional normalized (i.e., heat treated) drill rod, i.e., it shall be higher than 400 HV1. The steel in the presently claimed product shall have high hot hardness. The end piece might be normalized or carburized or may have been subjected to any other high temperature heat treatment. High temperature heat treatment here means that the steel has been heated above the A1 temperature, i.e., the temperature above which austenite (gamma phase) can be formed, for example as depicted by (E) in the Fe—C diagram in FIG. 6. The heat treatment may be case hardening (carburizing), carbonitriding, boriding, high frequency surface induction hardening, etc. It might also be some sort of surfacing like laser surface welding, powder spraying (fused coating), etc.

According to a preferred embodiment of the invention, the steel used for the components includes main elements, normally Cr, Mo and V, which are held at a level that gives a HAZ hardness of at least 390 HV1.

The chemical composition range for the steel type used in a rod according to the present invention can include, in weight-%, 0.15–0.40% C; ≦1.5% Si; ≧0.2% Mn; 0.5–1.5% Cr; 0.5–4% Ni; 0.5–2% Mo; ≦0.5% V; ≦0.5% W; ≦0.5% Ti; ≦0.1% Nb and ≦0.05% Al; the balance being Fe. An example of such steel may contain 0.18% C; 0.9% Si; 1.2% Cr; 1.8% Ni; 0.75% Mo and 0.1% V.

Also, small amounts of other elements forming carbides, nitrides or carbonitrides such as Ta and Zr are possible to use in the steel as those elements give a secondary hardening effect and also slow down the grain growth. B is another element that can be used as grain refiner together with nitrogen.

More specifically, the method for producing a friction welded product for rock drilling comprises the steps of providing components 22 and 25 of parent material, each having a high hot hardness, providing clamp means for clamping the first component 25, providing rotation means for rotating the second component 22, putting free ends of the first and second components together and rotating the first and second components relative to each other so as to form a weld 27 and cooling the weld to room temperature thereby keeping the lowest core hardness of the heat affected zone above 390 HV1. However, it is understood that any of the components 22 or 25 may be stationary while the other component 25 or 22 is rotatable during friction welding. The free ends of the rotatable 22 and non-rotatable 25 components can be joint prepared or free from joint preparation and have end surfaces substantially perpendicular to a rotational axis of the components.

Thus, the method according to the present invention provides a welding process wherein no heat treatment is necessary after friction welding. It is possible to apply corrosion protection substantially directly after friction welding and cooling. It is furthermore not necessary to bump up the end of the product since there will be no soft zones in the vicinity of the interface. Costly finishing operations are thus avoided since the friction welded product instantly will obtain a high strength weld.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A friction welded product for rock drilling, including a first component and a second component of parent material joined by a friction weld area, wherein the weld area consists of material from the component or components, said components having a central inner passage, said friction weld having an interface and heat affected zones on opposite sides thereof, characterized in that the components are made from a steel having a chemical composition such that the hardness in the heat affected zones is at least the same as that of a core hardness of the components when cooled to room temperature subsequent to the friction welding, the hardness at the heat affected zone being at least about 390 HV1and the steel having a hot hardness about 200 HV0.5 at 600° C. and/or exhibiting secondary hardening between 550–610° C. the components being of a steel composition, in weight %, containing 0.15–0.40% C; ≦1.5% Si; ≧0.2% Mn; 0.5–1.5% Cr; 0.5–4% Ni; 0.5–2% Mo; ≦0.5% V; ≦0.5% W; ≦0.5% Ti; ≦0.1% Nb and ≦0.05% Al; the balance being Fe.

2. A friction welded product according to claim 1, wherein the components are of a steel composition, in weight %, containing 0.18% C; 0.9% Si; 1.2% Cr; 1.8% Ni; 0.75% Mo and 0.1% V.

3. A friction welded product according to claim 1, wherein the product is a rock drill rod or a shank adapter.

4. A friction welded product according to claim 1, wherein the core hardness is at least 400 HV1.

5. A friction welded product according to claim 1, wherein the core hardness and the hardness of the heat affected zones differ by no more than 10%.

6. A friction welded product according to claim 1, wherein the steel exhibits a hot hardness of at least 200 HV0.5 at 600° C.

7. A friction welded product according to claim 1, wherein the steel exhibits secondary hardening between 550–610° C.

8. A friction welded product according to claim 1, wherein the steel includes at least one element selected from the group consisting of Ta, Zr, B, N, V, Mo, W, Ti, Nb and Cr.

9. A method for manufacturing a friction welded product for rock drilling, including a first component and a second component of parent material joined bya friction weld, said components having a central inner passage, wherein each component comprises a free end adapted to be welded to another free end thereby creating a friction weld, wherein the method comprises the steps of:

providing components of parent material, each having a hot hardness of at least about 200 HV0.5 at 600° C. and/or a secondary hardening between 550–610° C., providing clamp means for clamping the first component, providing rotation means for rotating the second component, putting free ends of the first and second components together and rotating the first and second components relative to each other so as to form a friction weld, and cooling the weld to room temperature thereby keeping the lowest core hardness of the heat affected zone above 390 HV1, the components being of a steel composition, in weight %, containing 0.15–0.40% C; ≦1.5% Si; ≧0.2% Mn; 0.5–1.5% Cr; 0.5–4% Ni; 0.5–2% Mo; ≦0.5% V; ≦0.5% W; ≦0.5% Ti; ≦0.1% Nb and ≦0.05% Al; the balance being Fe.

10. The method according to claim 9, wherein free ends of the first and second components are connected, said free ends being joint prepared or free from joint preparation and having end surfaces substantially perpendicular to a rotational axis of the components.

11. The method according to claim 9, wherein the heat affected zone has a hardness of at least 400 Hv1 without heat treating the friction weld subsequent to the cooling step.

12. The method according to claim 9, wherein the components are of a steel composition, in weight %, containing 0.18% C; 0.9% Si; 1.2% Cr; 1.8% Ni; 0.75% Mo and 0.1% V.

13. The method according to claim 9, wherein the product is a rock drill rod or a shank adapter.

14. The method according to claim 9, wherein the core hardness and the hardness of the heat affected zones differ by no more than 10%.

15. The method according to claim 9, wherein the steel exhibits a hot hardness of at least 200 HV0.5 at 600° C.

16. The method according to claim 9, wherein the steel exhibits secondary hardening between 550–610° C.

17. The method according to claim 9, wherein the steel includes at least one element selected from the group consisting of Ta, Zr, B, N, V, Mo, W, Ti, Nb and Cr.

* * * * *